United States Patent [19]

Erikson et al.

[11] Patent Number: 4,817,459
[45] Date of Patent: Apr. 4, 1989

[54] ENGINE STARTING AND POWER GENERATING SYSTEM

[75] Inventors: Evans W. Erikson; Richard W. Reynolds, both of Rockford; Daniel M. Ryan, Poplar Grove, all of Ill.

[73] Assignee: Sundstrand Corporation, Rockford, Ill.

[21] Appl. No.: 137,590

[22] Filed: Dec. 24, 1987

[51] Int. Cl.⁴ .................... F16H 47/04; F16H 47/08; F16H 47/00

[52] U.S. Cl. .......................................... 74/687; 74/677; 74/718

[58] Field of Search .................. 74/687, 677, 718, 720; 60/425

[56] References Cited

U.S. PATENT DOCUMENTS

| | | | |
|---|---|---|---|
| 3,074,296 | 1/1963 | Ebert | 74/687 |
| 3,274,855 | 9/1966 | Reynolds et al. | 74/687 |
| 3,300,000 | 1/1967 | Stoyke | 60/425 X |
| 3,442,153 | 5/1969 | Ross | 74/687 |
| 3,722,324 | 3/1973 | Cordner et al. | 74/687 |
| 3,786,696 | 1/1974 | Aleem | 74/687 |
| 4,211,070 | 7/1980 | Portmann | 60/39.08 |
| 4,278,928 | 7/1981 | Griffiths et al. | 322/29 |
| 4,315,442 | 2/1982 | Cordner | 74/687 |
| 4,592,454 | 6/1986 | Michel | 74/687 X |

FOREIGN PATENT DOCUMENTS

| | | | |
|---|---|---|---|
| 0885658 | 11/1981 | U.S.S.R. | 74/687 |
| 1177571 | 9/1985 | U.S.S.R. | 74/687 |
| 2141495 | 12/1984 | United Kingdom | 74/687 |

Primary Examiner—Dirk Wright
Assistant Examiner—Harold F. Macris
Attorney, Agent, or Firm—Wood, Datlon, Phillips, Mason & Rowe

[57] ABSTRACT

Operational efficiency in a combined engine starting and power generating system including an engine 110 connected to a dynamoelectric machine 142 useable as a motor or as a generator via a differential 114 and utilizing variable and fixed displacement hydraulic units 146, 156 is increased by sizing the variable and fixed hydraulic units 146 and 156 for power generating operation and by providing an auxiliary fixed displacement hydraulic unit 162 for use only during an engine starting mode.

10 Claims, 2 Drawing Sheets

ENGINE STARTING AND POWER GENERATING SYSTEM

FIELD OF THE INVENTION

This invention relates to an engine starting and power generating system, and more specifically, to such a system specifically adapted for use in aircraft wherein a dynamoelectric machine coupled to an aircraft engine may be selectively employed as a motor to start the engine or as a generator to generate electrical power for the aircraft.

BACKGROUND OF THE INVENTION AND DESCRIPTION OF THE PRIOR ART

For a number of years, aircraft manufacturers have desired to use the main electrical system of an aircraft for starting the main engines on the aircraft. One means by which this may be accomplished is to employ the dynamoelectric machine normally used as a generator and driven by an aircraft engine as a synchronous motor in an engine starting mode. Representative example of this approach may be found in commonly assigned U.S. Pat. No. 3,274,855 issued Sept. 27, 1966 to Reynolds et al; U.S. Pat. No. 3,786,696 issued Jan. 22, 1974 to Aleem; and U.S. Pat. No. 4,315,442 to Cordner.

Systems of the foregoing type as, for example, the Reynolds et al system, are acceptable for the purpose intended. However, the Reynolds system requires that hydraulic units employed as part of a constant speed drive therein be larger than would be necessary if the system were used solely for power generation.

The Reynolds et al system is schematically illustrated in FIG. 1 wherein there is shown an engine and associated gear box 10. An output shaft 12 from the engine and gear box 10 extends to a mechanical summer 14 which preferably will be a differential of known construction. The mechanical summer has three movable elements, one of which is connected to the shaft 12, and a second of which is connected via a shaft 16 to a dynamoelectric machine 18 which can alternatively serve as a generator during a power generating mode or as a synchronous motor during an engine starting mode.

The third rotary element of the differential 14 is connected via a shaft 20 to a normally fixed displacement hydraulic unit 22. Hydraulic lines 24 and 26 extend between the normally fixed hydraulic unit 22 and a variable displacement hydraulic unit 28. The variable hydraulic unit 28 is coupled via a shaft 30 to the shaft 16. Suitable gearing may be interposed between the various components and reference may be made to the previously identified Reynolds et al patent for further system detail.

In operating the system of FIG. 1 as a power generating system, torque from the engine and gear box 10 is transmitted to the dynamoelectric machine 18, now acting as a generator, via both the differential 14 and the shaft 16 on the one hand and the hydraulic units 22 and 28 together with the shafts 20 and 30 on the other. The torque necessary to operate the system in the power generating mode is at a particular level that is often less than the torque that must be transmitted in the opposite direction through the same components when the dynamoelectric machine 18 is acting as a synchronous motor for starting the engine 10. Consequently, in the Reynolds et al system, the hydraulic units 22 and 28 often must be made sufficiently large as to handle the higher torque level transmitted during a engine starting mode. This in turn means that these components will be physically larger than would be required if the system operated solely in a power generating mode.

The present invention is directed to overcoming one or more of the above problems.

SUMMARY OF THE INVENTION

It is the principal object of the invention to provide a new and improved engine starting and power generating system that is primarily intended for aircraft use. More specifically, it is an object of the invention to provide such an engine starting and power generating system wherein the hydraulic components used for constant speed drive operation during a power generating mode may be sized specifically for that operation and yet the system as a whole is provided with sufficient torque transmission capability as to function as a starter drive system.

An exemplary embodiment of the invention achieves the foregoing objects in a system including an engine requiring a first torque level input to be started, a dynamoelectric machine alternatively useable as a motor in an engine starting mode or as a generator in a power generating mode and requiring a second torque level input less than the first torque level input to operate in the power generating mode, and means interconnecting the engine and the machine. Such interconnecting means include a mechanical summer and first, second and third hydraulic units, the third hydraulic unit being a variable displacement hydraulic unit. Hydraulic lines connect the first and second hydraulic units to the third hydraulic unit in parallel with each other and the first and third hydraulic units are sized so as to, together with the mechanical summer, provide the second torque level to the dynamoelectric machine from the engine during a power generating mode. The first, second and third hydraulic units are also sized so as to, together with the mechanical summer, provide the first torque level from the dynamoelectric machine to the engine during engine starting mode.

The third hydraulic unit is coupled to the dynamoelectric machine, the first hydraulic unit is selectively coupled to the differential, and the second hydraulic unit is coupled to the engine. Means are provided for selectively isolating the second hydraulic unit from the remainder of the system when the engine approaches a given speed during an engine starting mode.

In this way, the first and third units may be sized sufficiently small so as to only provide the necessary capacity for operation of the system in a power generating mode. That is to say, they act to provide a constant speed function. However, when additional torque transmission is required as in the engine starting mode, the second hydraulic unit is brought into play for that purpose, but is otherwise isolated from the system.

In a preferred embodiment of the invention, the mechanical summer is a differential.

The invention also contemplates that the isolating means mechanically decouple the second hydraulic unit from the engine and block hydraulic flow from the first and third hydraulic units to the second hydraulic unit under the conditions specified above.

In a highly preferred embodiment of the invention, there is an engine along with dynamoelectric machine as stated previously. The means interconnecting the engine and the machine include a differential having first, second and third rotary elements, first and second hydraulic units, a variable displacement hydraulic unit, first, second and third overrunning clutches, hydraulic lines connecting the first and second hydraulic units to the variable hydraulic unit in parallel with each other, and a check valve in one of the lines for hydraulically isolating the second hydraulic unit from the variable hydraulic unit when the system is in a power generating mode.

The first rotary element of the differential is connected by both of the first and second clutches to the first hydraulic unit with the first and second clutches being arranged to overrun in opposite torque directions. The second rotary element of the differential is connected to the dynamoelectric machine and to the variable displacement unit and the third rotary element is connected to the engine which in turn is connected to the second hydraulic unit via the third clutch. The third clutch is disposed to begin to overrun when the torque reverses at the termination of the engine starting mode.

The hydraulic units and the differential are sized in the manner specified previously.

Other objects and advantages will become apparent from the following specification taken in connection with the accompanying drawings.

DESCRIPTION OF THE PREFERRED EMBODIMENT

Figure 1:
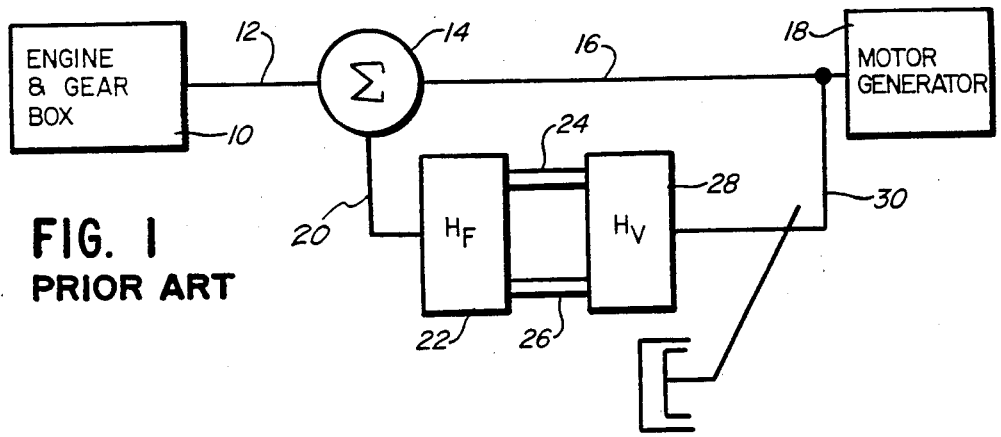
FIG. 1 is a schematic of an engine starting and power generating system made according to the prior art, and specifically, according to the previously identified Reynolds U.S. Pat. No. 3,274,855.
Figure 2:
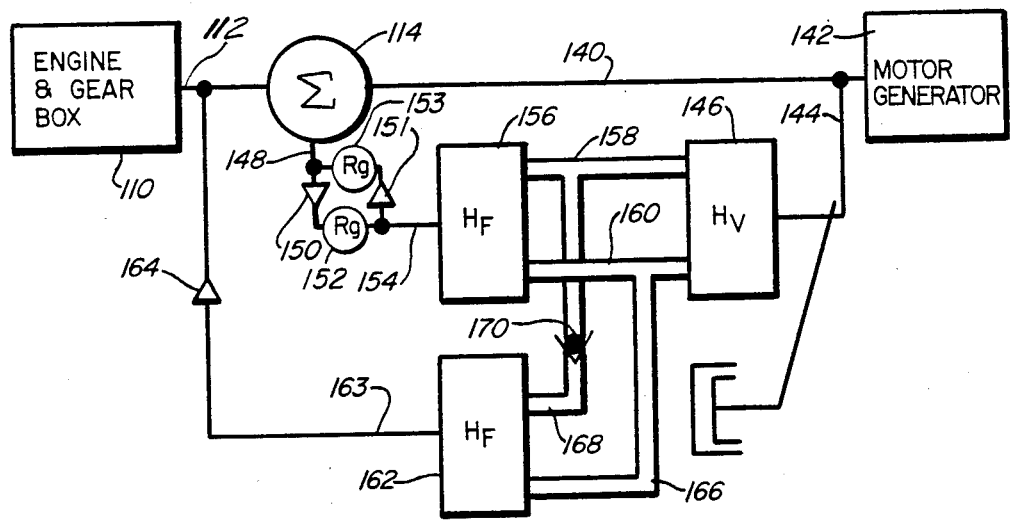
FIG. 2 is a schematic of an engine starting and power generating made according the invention.
Figure 3:
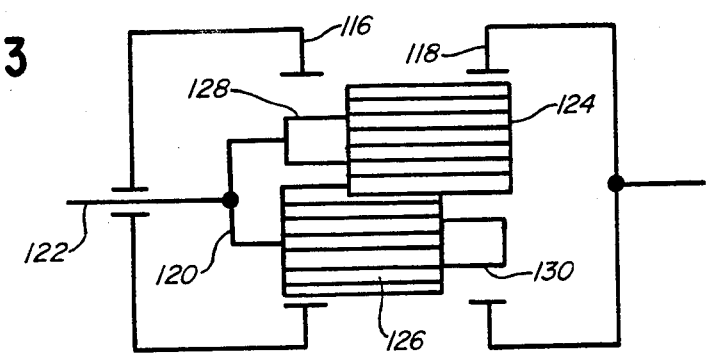
FIG. 3 is a somewhat schematic illustration of a mechanical summer, specifically a differential, employed in the of the invention.

An exemplary embodiment of an engine starting and power generating system made according to the invention is illustrated in FIG. 2 and is seen to include an engine and gear box 110 having a rotary shaft 112 which is coupled by any suitable means to a rotary element of a mechanical summer 114 in the form of a differential. The summer or differential 114 is shown somewhat schematically in FIG. 3 and is of known construction. The same includes first and second ring gears 116 and 118 in axially spaced, but generally coaxial relation constituting two rotary elements. A third rotary element is a carrier 120 and associated shaft 122. The carrier 120 mounts two meshed planet gears 124 and 126. The planet gears 124 have opposite ends of reduced diameter as at 128 and 130. As a consequence, the ring gear 116 will engage only the planet 126 and the ring gear 118 will engage only the planet 124. Those skilled in the art will recognize that such a differential is commonly employed in constant speed drives manufactured by the assignee of the instant application and that its operation is well known.

Returning to FIG. 2, a second of the rotary elements of the differential 114 may be coupled via a shaft 140 to a dynamoelectric machine 142 which may be alternatively employed as a generator to generate power or which may be used as a synchronous motor for starting the engine 110. Also coupled to the dynamoelectric machine 142 is a shaft 144 which is connected to a variable displacement hydraulic unit 146 which is generally of the type disclosed in the previously identified Reynolds et al patent.

A third rotary element of the differential is coupled via a shaft 148 to first and second, oppositely directed, overrunning clutches 150 and 151. The clutches 150 and 151 are arranged in mechanical parallel with each other and in series with respective gear trains 152 and 153 of differing ratios for power transmission purposes. The clutch 150 is adapted to drive at one ratio for one direction of torque transmission while the clutch 151 is adapted to drive at a different ratio for the opposite direction of torque transmission because of the presence of the gear trains 152 and 153. Normally, the gear train 153 in series with the clutch 151 will have a higher gear ratio than the gear train 152 in series with the clutch 150. Those skilled in the art will recognize that such an arrangement makes optimal use of the capacity of the various hydraulic units.

The clutches 150 and 151 are coupled to the shaft 154 of a normally fixed displacement hydraulic unit 156 of the type disclosed in the Reynolds patent and hydraulic lines 158 and 160 corresponding to the lines 24 and 26 and the prior art device interconnect the hydraulic units 156 and 146.

The system includes an additional, normally fixed displacement hydraulic unit 162 having a shaft 163 which is coupled via an overrunning clutch 164 to the shaft 112. The overrunning clutch 164 is arranged so that as the engine approaches a self sustaining speed, or some other predetermined speed, the rotational rate of the shaft 112 may overrun the shaft 163 of the second fixed displacement hydraulic unit 162. Hydraulically, the second fixed displacement hydraulic unit 162 includes a conduit 166 in fluid communication with the hydraulic line 160 and a conduit 168 extending through a check valve 170 to the hydraulic line 158. The arrangement is such that hydraulic fluid under pressure may flow from the second fixed displacement hydraulic unit 162 to the line 158, but not the reverse.

As will be seen, when the engine 10 overruns the unit 162 the flow of pressurized hydraulic fluid to the second unit 162 will be blocked by the check valve 170 as well, as thus, check valve 170 and the overrunning clutch 164 serve to isolate the second unit 162 from the remainder of the system in this instance.

Figure 4:
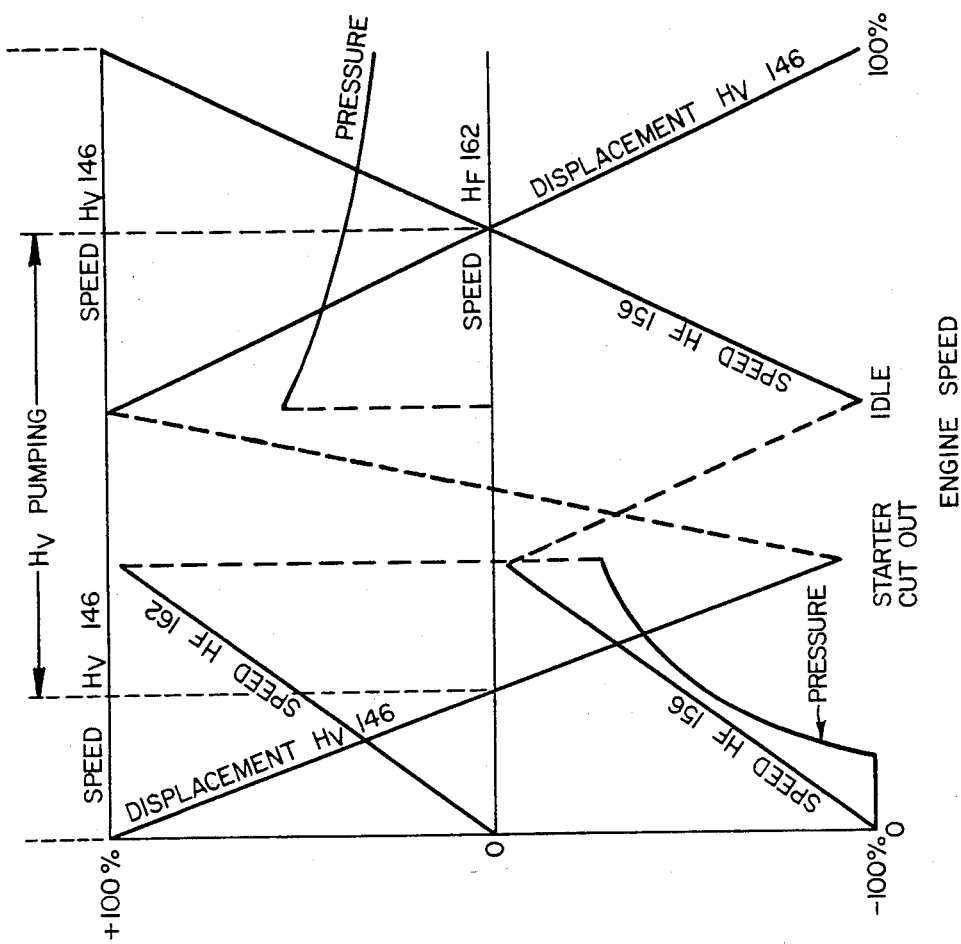
FIG. 4 is a graphic illustration of the operation of the system.

Operation in a power generating mode is as conventional in systems of this type. Various operational parameters of the components are illustrated in FIG. 4 to the right of that point marked "idle" on the engine speed side of the graph. In particular, the speed of the second fixed hydraulic unit 162 will be zero because the engine and gear box 110 and the output shaft 112 will be overrunning the speed of the shaft 163 from a predetermined lesser speed, namely, that designated "starter cut-out" and because there will be no supply of hydraulic fluid under pressure to the unit 162 by reason of the check valve 170 preventing such fluid communication.

The speed of the first fixed unit 156 may vary from plus to minus 100% according to engine speed. The displacement of the variable unit 146 may similarly vary as conventional control of the displacement of the variable unit 146 is exercised to maintain constant motor generator speed for power generation speed. Thus the speed of the variable unit 146 will be 100% of the rated speed.

During an engine start mode of operation, initially, the shaft 112 will be stationary. The dynamoelectric machine 142 may be brought up to speed as a synchronous motor and because the shaft 112 is effectively locked by the inertia of the engine in gear box 110, the rotation of the dynamoelectric machine 142 will be imparted to the first fixed unit 156 via the overrunning clutch 150, and the same will be at its maximum speed and operating as a pump.

At this time, the variable unit 146 will be set at maximum displacement acting as a motor. It will be turning at the synchronous speed of the dynamoelectric machine 142.

The displacement of the variable unit 146 will be progressively shifted from full displacement with the unit 146 acting as a motor to full displacement with the unit 146 acting as a pump. This occurs over an engine speed range of zero to an engine speed whereat the starter is to be cut out.

As a result of this change of displacement, a pressure will be created in conduit 166, driving and accelerating the engine and gear box 110 with the hydraulic unit 162 through the overrunning clutch 164. At the same time, the speed of the first fixed unit 156 will begin to diminish to retard the speed of the associated rotary element within the differential 114.

During this period of time, it will be appreciated that there are parallel paths for the transmission of torque, one mechanical through the differential 114, and the others hydromechanical through the hydraulic units 146, 156, and 162.

So-called "starter cut-out" is achieved when the variable hydraulic unit 146 reaches full displacement and can no longer create a pressure in the conduit 160. Starter cut-out speed is the engine speed at which starting torque from the dynamoelectric machine 142 is no longer required to accelerate the engine to the "idle" speed. The idle speed is the minimum engine speed at which the engine may be utilized for generating power.

In some instances, it may be desirable that the fixed displacement unit 156 in fact be a two displacement position unit with the additional position being one for zero displacement. This will allow the fixed displacement unit 156 to be at zero displacement during the initial portion of the engine start cycle so that the dynamoelectric machine 142 can be readily accelerated up to synchronous speed. Such an arrangement will reduce the parasitic load on the dynamoelectric machine 142 and reduce the tim required for such acceleration. Once full speed of the dynamoelectric machine 142 has been attained, the unit 156 may then be switched to its normal fixed displacement.

A number of advantages accrue from the foregoing. The system, by allowing the first fixed hydraulic unit 156 and the variable unit 146 to be sized for constant speed drive operation provides a weight and volume savings.

This same feature of the invention eliminates the need for oversized hydraulics that would only be required approximately 2% of the time, 98% of the time the system being in a generating mode. By eliminating oversized hydraulics, the amount of heat generated in the system which must be rejected is minimized; and this in turn means that the heat rejection system may be made smaller and that there will be less waste heat, meaning greater fuel efficiency or increased engine thrust.

We claim:

1. An engine starting and power generating system comprising:

an engine requiring a first torque level input to be started;

a dynamoelectric machine alternatively usable as a motor in an engine starting mode or a generator in a power generating mode and requiring a second torque level input, less than said first torque level input, to operate as a generator;

means interconnecting said engine and said machine including a differential having first, second and third rotary elements, first and second hydraulic units, a variable displacement hydraulic unit, first, second and third overrunning clutches, hydraulic lines connecting said first and second hydraulic units to said variable hydraulic unit and in parallel with each other and a check valve in one of said lines for hydraulically isolating said second hydraulic unit from said variable hydraulic unit when said system is in a power generating mode;

said first rotary element being connected via both said first and second clutches to said first hydraulic unit with said first and second clutches arranged to overrun in opposite directions of rotation and torque transmission, said second rotary element being connected to said dynamoelectric machine and to said variable displacement unit, and said third rotary element being connected to said second hydraulic unit via said third clutch, said third clutch being disposed to begin to overrun when said engine is approaching idle speed during an engine starting mode;

said first hydraulic unit and said variable hytdraulic unit being sized so as to, together with said differential provide said second torque level to said dynamoelectric machine from said engine during a power generating mode; and said first and second hydraulic units and said variable hydraulic unit being sized so as to together with differential, provide said first torque level from said dynamoelectric machine to said engine during an engine starting mode.

2. The engine starting and power generating system of claim 1 wherein at least one of said first and second hydraulic units is a fixed displacement hydraulic unit.

3. An engine starting and power generating system comprising:

an engine requiring a first torque level input to be started;

a dynamoelectric machine alternatively usable as a motor in an engine starting mode or a generator in a power generating mode and requiring a second torque level input, less than said first torque level input, to operate as a generator;

means interconnecting said engine and said machine including a mechanical summing apparatus having first, second and third movable elements, first and second hydraulic units, a variable displacement hydraulic unit, first, second and third coupling devices, hydraulic lines connecting said first and second hydraulic units to said variable hydraulic unit and in parallel with each other, and a valve in one of said lines for hydraulically isolating said second hydraulic unit from said variable hydraulic unit when said system is in a power generating mode;

said first element being connected via both said first and second coupling devices to said first hydraulic unit with said first and second coupling devices arranged in parallel so as to disengage in opposite directions of movement and torque transmission, said second rotary element being connected to said dynamoelectric machine and to said variable displacement unit, and said third element being connected to said second hydraulic unit via said third coupling device, said third coupling device being disposed to begin to disengage when said engine is approaching idle speed during an engine starting mode;

said first hydraulic unit and said variable hydraulic unit being sized so as to, together with said mechanical summing apparatus provide said second torque level to said dynamoelectric machine from said engine during a power generating mode; and said first and second hydraulic units and said variable hydraulic unit being sized so as to together with said mechanical summing apparatus, provide said first torque level from said dynamoelectric machine to said engine during an engine starting mode.

4. The engine starting and power generating system of claim 3 wherein said mechanical summing apparatus is a differential and said movable elements comprise a carrier and at least one ring gear.

5. The engine starting and power generating system of claim 4 wherein said coupling devices are clutches.

6. The engine starting and power generating system of claim 5 wherein said clutches are overrunning clutches.

7. The engine starting and power generating system of claim 3 wherein said first hydraulic unit has at least two different displacements.

8. An engine starting and power generating system comprising:

an engine requiring a first torque level input to be started;

a dynamoelectric machine alternatively usable as a motor in an engine starting mode or a generator in a power generating mode and requiring a second torque level input, less than said first torque level input, to operate in said power generating mode;

means interconnecting said engine and said machine including a differential, first, second and third hydraulic units, said third hydraulic unit being a variable displacement hydraulic unit, and hydraulic lines connecting said first and second hydraulic units to said third hydraulic unit and in parallel with each other;

said first and third hydraulic units being sized so as to, together with said differential, provide said second torque level to said dynamoelectric machine from said engine during a power generating mode;

said first, second and third hydraulic units being sized so as to, together with said differential, provide said first torque level from said dynamoelectric machine to said engine during an engine starting mode; and said third hydraulic unit being coupled to said dynamoelectric machine;

said first hydraulic unit being selectively coupled to said differential;

said second hydraulic unit being coupled to said engine; and means for selectively isolating said second hydraulic unit from the remainder of said system when the engine approaches a given speed during an engine starting mode.

9. The engine starting and power generating system of claim 8 wherein said isolating means decouples said second hydraulic unit from said engine and blocks hydraulic flow from said first and third hydraulic units to said second hydraulic unit during said power generating mode.

10. The engine starting and power generating system of claim 8 wherein said first hydraulic unit is variable between at least two different displacements.

* * * * *